United States Patent [19]

Mehta et al.

[11] Patent Number: 5,358,792
[45] Date of Patent: Oct. 25, 1994

[54] HEAT SEALABLE BLEND OF VERY LOW DENSITY POLYETHYLENE OR PLASTOMER WITH POLYPROPYLENE BASED POLYMERS AND HEAT SEALABLE FILM AND ARTICLES MADE THEREOF

[75] Inventors: Aspy K. Mehta, Humble, Tex.; Michael C. Chen, Duisburg-Tervuren, Belgium

[73] Assignee: Exxon Chemical Patents Inc., Linden, N.J.

[21] Appl. No.: 51,594

[22] Filed: Apr. 23, 1993

Related U.S. Application Data

[63] Continuation of Ser. No. 660,402, Feb. 22, 1991, abandoned.

[51] Int. Cl.$^5$ ............... C08L 23/08; C08L 23/10; B32B 27/32; B32B 27/00
[52] U.S. Cl. ............... 428/516; 525/240; 428/476.9; 428/483
[58] Field of Search ............... 525/240; 428/516, 476.9, 428/483

[56] References Cited

U.S. PATENT DOCUMENTS

| | | | |
|---|---|---|---|
| 4,291,092 | 9/1981 | Weiner | 428/516 |
| 4,339,496 | 7/1982 | Weiner | 428/516 |
| 4,340,640 | 7/1981 | Weiner | 428/516 |
| 4,340,641 | 7/1982 | Weiner | 428/516 |
| 4,405,774 | 9/1983 | Miwa et al. | 526/348.4 |
| 4,612,300 | 9/1986 | Coleman et al. | 526/116 |
| 4,643,945 | 2/1987 | Kiang | 428/349 |
| 4,668,752 | 5/1987 | Tominari et al. | 526/348.5 |
| 4,734,328 | 3/1988 | Kohyama | 525/240 |
| 4,937,299 | 6/1990 | Ewen et al. | 526/119 |

FOREIGN PATENT DOCUMENTS

| | | |
|---|---|---|
| 0057238 | 8/1982 | European Pat. Off. |
| 0180478 | 5/1986 | European Pat. Off. |
| 0186279A2 | 7/1986 | European Pat. Off. |
| 0221726A2 | 5/1987 | European Pat. Off. |
| 0260038A2 | 3/1988 | European Pat. Off. |
| 0286177A1 | 10/1988 | European Pat. Off. |
| 0341091A2 | 11/1989 | European Pat. Off. |
| 0397517 | 11/1990 | European Pat. Off. |
| 61-243842-A | 10/1986 | Japan. |
| 061-246061-A | 11/1986 | Japan. |
| 52-094381-A | 8/1987 | Japan. |
| 2063278 | 6/1981 | United Kingdom. |
| 9003414 | 4/1990 | World Int. Prop. O. ......... 525/240 |

*Primary Examiner*—Carman J. Seccuro, Jr.
*Attorney, Agent, or Firm*—Jaimes Sher

[57] ABSTRACT

Disclosed are heat sealable compositions comprising: (a) from about 30 to about 70 weight percent a low melting polymer comprising an ethylene based copolymer having a density of from about 0.88 g/cm$^3$ to about 0.915 g/cm$^3$, a melt index of from about 1.5 dg/min to about 7.5 dg/min, a molecular weight distribution no greater than about 3.5, and a composition breadth index greater than about 70 percent; and, (b) from about 70 to about 30 weight percent of a propylene based polymer having from about 88 mole percent to about 100 mole percent propylene and from about 12 mole percent to about 0 mole percent of an alpha-olefin other than propylene. Further disclosed are films and articles made thereof.

16 Claims, 8 Drawing Sheets

HEAT SEALABLE BLEND OF VERY LOW DENSITY POLYETHYLENE OR PLASTOMER WITH POLYPROPYLENE BASED POLYMERS AND HEAT SEALABLE FILM AND ARTICLES MADE THEREOF

This is a continuation, of application Ser. No. 07/660,402, filed Feb. 22, 1991, now abandoned.

BACKGROUND OF THE INVENTION

1. Field of the Invention

This invention relates to blends of very low density polyethylene or plastomers with propylene based polymers. In another aspect, this invention relates to blends of very low density polyethylenes or plastomers with propylene based polymers which are useful as heat sealable compositions, and to films and articles made thereof.

2. Description of the Prior Art

Plastic films have found utility in a wide variety of packaging applications such as for example bags, pouches, tubes and trays. In many film packaging applications it is necessary to seal the film during the packaging operation. This may be accomplished by using adhesives or by using heat sealing techniques. When heat sealing is used, it is important that the plastic film be readily heat sealable while also possessing other good physical and mechanical properties such as resistance to tearing, tensile strength, and processabilty in high speed equipment.

For example in packaging items into a bag made from film, film is generally first processed into a bag, a bottom being formed by squeezing together two films, and subjecting the bottom to a temperature above the seal initiation temperature under pressure, to seal the bottom of the bag. The bag is subsequently filled with the goods to be packaged, and the top is sealed in a fashion similar to how the bottom was sealed.

Film heat sealing is generally affected by means of heated flat surfaces, between which the films are forcefully pressed together at a temperature above the seal initiation temperature of the film. When use is made of equipment such as vertical form, fill and seal machines, the bag is filled with the contents to be packaged while the bottom seal is still hot. Cooling the seal would entail too long a waiting time, thus lengthening the cycle time and increase operating costs. Consequently, the film must be one which enables the formation of a strong seal even as the seal formed is at or near the seal formation temperature.

It is evident that an important characteristic for a heat sealable film is the temperature at which the sealing begins, i.e. the heat seal initiation temperature. It is desired to operate at as low of a temperature as possible because (1) it broadens the heat sealable range, (2) it permits higher productivity due to less time for cooling, (3) it requires less energy to heat seal at lower temperature, and (4) at a lower heat seal initiation temperature, the film is more forgiving of inadequacies in the heat sealing equipment.

Many commonly used plastic materials which are used in the formation of film products could benefit from an improvement of their heat sealing characteristics. For example, crystalline polypropylene films have found extensive use in the field of packaging. Polypropylene films, in both oriented or non-oriented form, are used widely in packaging applications because of their superiority in mechanical properties such as tensile strength, rigidity, surface hardness, and optical properties such as gloss and transparency, and food hygiene such as freedom from toxicity and odor. However, polypropylene films (including those from polypropylene copolymers) typically require heat sealing initiation temperatures upwards of about 120° C. before adequate film seal strengths (at least 200 g/inch, desirably 400 g/inch and higher per specified settings for pressure and dwell time) are obtained. Consequently, there has been quite a bit of development work to find ways that would allow the heat sealing of propylene films at lower temperatures. Such approaches have included the use of coatings, blend components and multiple film layers. For example, U.S. Pat. No. 4,291,092 and divisionals, U.S. Pat. Nos. 4,339,496, 4,340,640 and 4,340,641, all disclose a heat sealable packaging film layer for a polypropylene substrate wherein the film layer comprises a blend of a copolymer of ethylene and a higher olefin and a copolymer of propylene and a higher olefin. U.S. Pat. No. 4,643,945 discloses the use of a linear low density polyethylene in a heat sealable film composition, and E.P. 0221726 discloses a heat sealable layer comprising very low density polyethylene blended optionally with a polyolefin.

Unfortunately, the prior art heat sealable films are not without certain deficiencies. A need still exists in the industry for a heat sealable layer having a seal initiation temperature of about 110° C. or lower while the film maintains good elevated temperature resistance, abrasion resistance, blocking resistance, good strength and rigidity, and good film optical properties.

A class of highly active olefin catalysts known as metallocenes is well known especially in the preparation of polyethylene and copolyethylene-alpha-olefins. These catalysts, particularly those based on group IV B transition metals, zirconium, titanium and hafnium, show extremely high activity in ethylene polymerization. The metallocene catalysts are also highly flexible in that, by manipulation of catalyst composition and reaction conditions, they can be made to provide polyolefins with controllable molecular weights from as low as about 200 (useful in applications such as lube oil additives) to about 1 million or higher, as for example in ultra high molecular weight linear polyethylene. At the same time, the molecular weight distribution of the polymers can be controlled from extremely narrow (as in a polydispersity, $M_w/M_n$ of about 2), to broad (a polydispersity of about 8).

Exemplary of the development of these metallocene catalysts for the polymerization of ethylene is U.S. Pat. No. 4,937,299 to Ewen et al. hereby incorporated by reference. Among other things, this patent teaches that the structure of the metallocene catalyst includes an alumoxane, formed when water reacts with trialkyl aluminum with the release of methane, which alumoxane complexes with the metallocene compound to form the catalyst.

There are a number of structural variables in polyolefins which effect the ultimate properties of the polymer. Two of the most important are composition distribution (CD) and molecular weight distribution (MWD). Composition distribution (CD) refers to the distribution of comonomer between copolymer molecules. This feature relates directly to polymer crystallizability, optical properties, toughness and many other important use characteristics. Molecular weight distribution (MWD) plays a significant role in melt processability as well as the level and balance of physical properties achievable. Molecular weight (MW) determines the level of melt viscosity and the ultimately desired physical properties of the polymer. The type and amount of comonomer effects the physical properties and crystallizability of the copolymer. All of these structural features (MW, MWD, CD, comonomer type and amount) are readily controllable through the use of metallocene catalysts as exemplified in U.S. Pat. No. 4,937,299 cited above.

Metallocene catalysts are particularly attractive in making tailored ultrauniform and super random specialty copolymer. For example, if a lower density copolymer is being made with a metallocene catalyst such as very low density polyethylene, (VLDPE), an ultrauniform and super random copolymerization will occur, as contrasted to the polymer produced by copolymerization using a conventional Ziegler catalyst.

In view of the ongoing need for heat sealable films of optimum quality for particular uses, it would be desirable to provide compositions utilizing the high quality characteristics of very low density polyethylene prepared with metallocene catalysts.

Accordingly, the present invention relates to polyolefin homopolymer and copolymer blends utilizing as a low temperature polymer, ethylene based polymers, either VLDPEs or plastomers, prepared by metallocene catalysts. The blends of the present invention are particularly useful as heat sealable films in plastic packaging.

SUMMARY OF THE INVENTION

According to one embodiment of this invention there are provided polymer blend compositions comprising: (a) a low melting polymer that is an ethylene based copolymer produced with a metallocene catalyst, and (b) a propylene based polymer. In the polymer blend, component (a) is preferably about 30 to about 50 weight percent of the blend based on the total weight of (a) and (b). Suitable copolymers that may be used as blend component (a) include very low density polyethylenes and plastomers which have a density in the range of about 0.88 g/cm$^3$ to about 0.915, g/cm$^3$, a melt index in the range of about 1.5 dg/min to about 7.5 dg/min, a molecular weight distribution ($M_w/M_n$) of about 1.5 to about 3.5, an essentially single melting point in the range of about 60° C. to about 115° C., measured as a DSC peak $T_m$. The term "essentially single melting point" means that at least about 80 wt % of the polymer mass corresponds to that material which is associated to a melting point peak found in the range of 60° C. to about 115° C. as determined by DSC analysis. The VLDPE or plastomer is a copolymer of ethylene and an olefin other than ethylene and has a composition distribution breadth index about 70% or higher. This parameter distinguishs the VLDPEs and plastomers utilized by this invention from competitive products available commercially. Blend component (b) is preferably about 70 to about 50 weight percent of the blend, based on the total weight of blend component (a) and (b). Blend component (b) is a propylene based polymer comprising: (i) about 88 mole percent to about 99 mole percent propylene based on the total moles of olefin and propylene and (ii) about 12 mole percent to about 1 mole percent of an olefin other than propylene. The polymer blend is formed by mixing blend components (a) and (b) under high shear mixing conditions. A unit such as a twin-screw extruder would be an example of a suitable piece of mixing equipment. Other means to achieve a well mixed blend will be apparent to those skilled in the art.

Another embodiment of this invention comprises film or sheet articles formed from a polymer blend as above described.

According to yet another embodiment of this invention there are provided multiple layer heat sealable films comprising at least one base layer and at least one heat sealable layer, the heat sealable layer comprising a film or sheet formed from a polymer blend as described above.

DESCRIPTION OF THE INVENTION

The polymer blend compositions of the present invention that are useful as a heat sealable composition for making heat sealable polypropylene films and other heat sealable articles comprise (a) a low melting polymer ingredient that is an ethylene based copolymer produced with a metallocene catalyst; and (b) a propylene based polymer or copolymer.

The term "PLASTOMERS" as used herein refers generally to a class of ethylene based copolymers with density of less than about 0.900 g/cm$^3$ (down to about 0.865 g/cm$^3$) at a molecular weight, $M_w$ greater than about 20,000 (about 200 MI and lower). Plastomers have an ethylene crystallinity between PLASTics (i.e. linear low density and very low density polyethylenes) and ethylene/alpha-olefin elastTOMERS.

In contrast, VLDPEs typically have densities n the range of about 0.90 to about 0.915 g/cm$^3$.

Other properties of the plastomers and VLDPEs suitable for use in the present invention are explained herein.

The preference as to whether to use VLDPE's or plastomers as the low melting polymer ingredient will depend on the requirements of the particular application in which the blend will be utilized, economics, and other process factors.

The compositions of the present invention comprise from about 30 to about 70 percent, preferably 40 to about 60, and most preferably about 50 weight percent low melting polymer, and from about 70 to about 30 percent, preferably 60 to about 40, and most preferably about 50 weight percent propylene based polymer.

The VLDPEs and plastomers utilized as the low melting polymers of the present invention are ethylene/alpha-olefin copolymers wherein the alpha-olefin can have from 3–20 carbon atoms such as ethylene/butene-1, ethylene/hexene-1, ethylene/octene-1, and ethylene/propylene copolymers. These ethylene copolymers with prescribed range of comonomer levels can be prepared by polymerization of the suitable olefins in the presence of supported or unsupported metallocene catalysts systems.

The low melting polymer ingredient utilized in the present invention has a density in the range of about 0.88 g/cm$^3$ to about 0.915 g/cm$^3$. Preferably the density is in the range of about 0.89 g/cm$^3$ to about 0.91 g/cm$^3$. Densities above about 0.90 g/cm$^3$ were measured using standard accepted procedures. At densities below about 0.90 g/cm$^3$, the samples were additionally conditioned by holding them for 48 hours at ambient temperature (23° C.), prior to density measurement.

The melt index (MI) of the low melting polymer ingredient of the present invention is in the range of about 1.5 dg/min to about 7.5 dg/min. Preferably the MI is in the range of about 1.7 dg/min to about 5.0 dg/min. MI as measured herein was determined according to ASTM D-1238 (190/2.16). High load MI was determined according to ASTM D-1238 (190/21.6).

The low melting polymer ingredient of the present invention has a narrow molecular weight distribution. The ratio of $M_w/M_n$ is generally in the range of about 1.5 to about 3.5. Preferably in the range of about 2.0 to about 3.0.

The low melting polymer ingredient of the present invention should have an essentially single melting point characteristic with a peak melting point ($T_m$) as determined by Differential Scanning Colorimetry (DSC) in the range of about 60° C. to about 115° C. Preferably the DSC peak $T_m$ is in the range of about 80° C. to about 100° C. "Essentially single melting point" as used herein means that at least about 80% wt of the material corresponds to a single $T_m$ peak existing in the range of about 60°–115° C., and there is essentially absent from the polymer any substantial fraction of material which corresponds to a $T_m$ peak found at a temperature higher than about 115° C., i.e., "essentially" the bulk material content of the polymer corresponds to a "single" melting point peak in the 60°–115° C. range, and "essentially" no substantial fraction of the material has a peak melting point in excess of about 115° C., as determined by DSC analysis.

DSC measurements were made on a Perkin Elmer System 7 Thermal Analysis System. Melting information reported are second melting data i.e. sample heated at programmed rate of 10° C./min to a temperature above its melting range. Sample then cooled in instrument at programmed rate of 10° C./min to temperature below its crystallization range. Sample reheated (2nd melting) at programmed rate of 10° C./min.

The presence of higher melting peaks is detrimental to film properties such as haze, and compromises the chances for meaningful reduction in the seal initiation temperature of the final film.

Figure 1A:
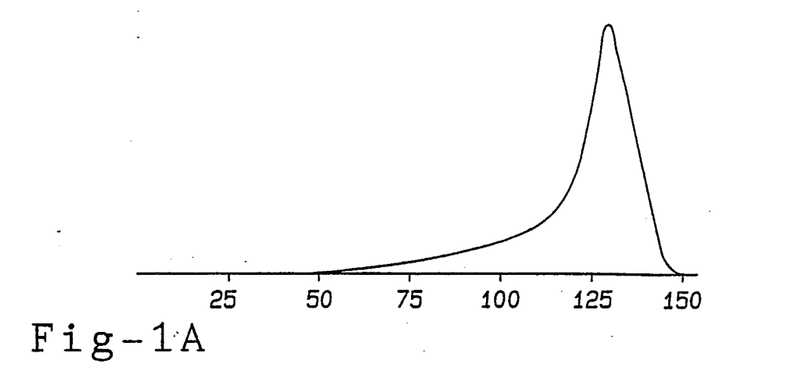
FIG. 1 shows idealized DSC melting behavior curves for determining the proper components for a blend, wherein curve (A) represents a propylene based polymer useful as blend component (b); curve (B) represents a low melting ethylene based copolymer useful as blend component (a); curve (C) represents a polymer blend of components (a) and (b); and curve (D) represents a low melting ethylene based copolymer which does not have an "essentially single" melting point in the range of 60° to 125° C. and is not suitable as a blend component (a).

FIG. 1A shows the Melting behavior for neat random copolymer polypropylene. The peak melting point shown is approximately 132° C. which translates to seal initiation temperature of approximately 120° C. and higher before adequate seal strength obtained.

Figures 1B, 1C, 1D:
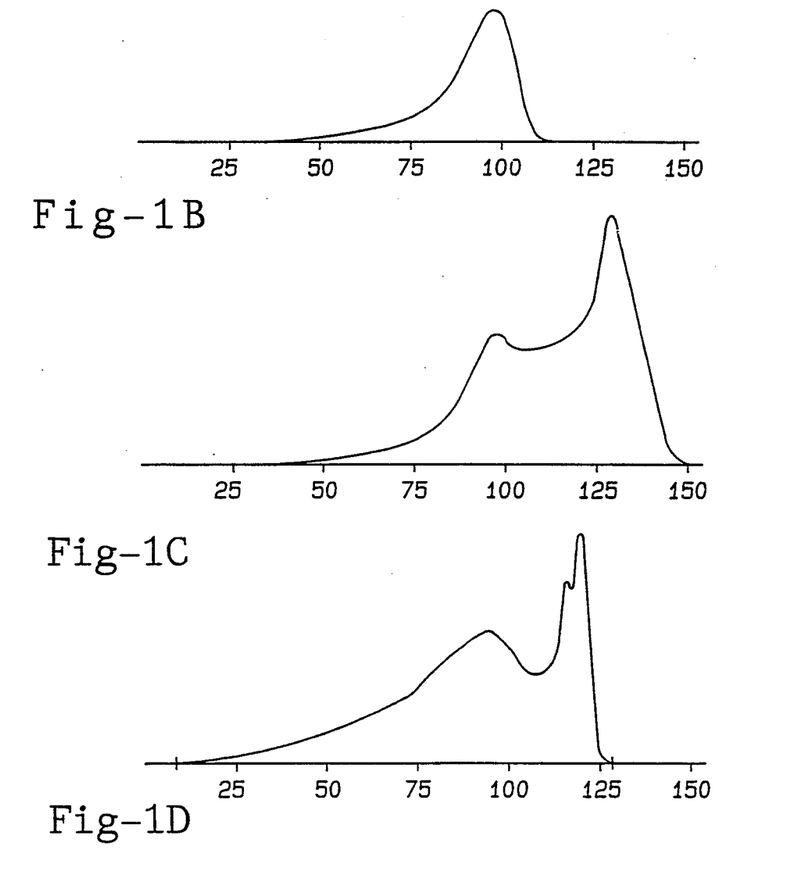
Figure 2:
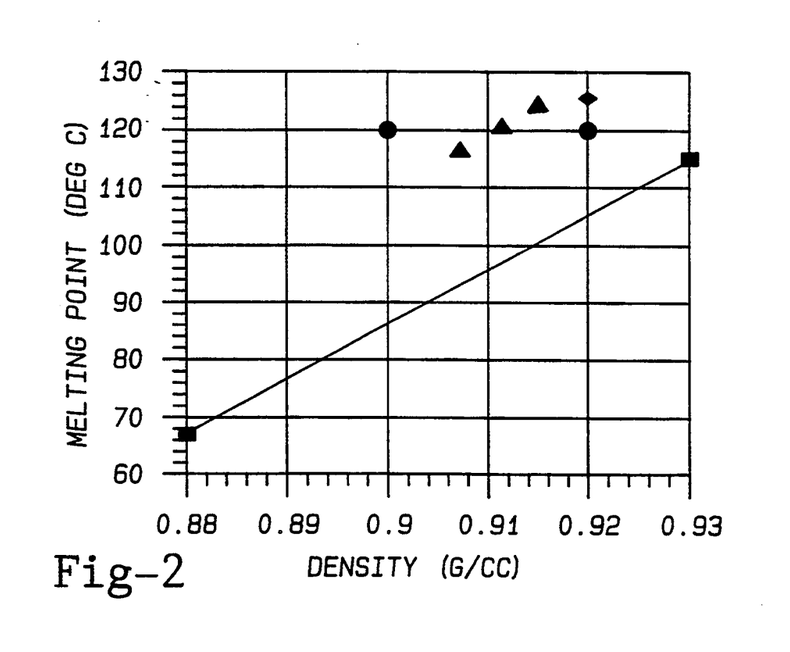
FIG. 2 is a graph of melting point vs. density for various copolymers of ethylene; circle, diamond and triangle points representing copolymer materials produced by a non-metallocene catalyst, and box points and line representing copolymer materials produced by a metallocene catalyst.

FIG. 1B shows the melting behavior of LDPEs, Plastomers of this invention as the low melting component (Schematic for typical 0.908D VLDPE). The narrow molecular weight distribution ($M_w/M_n$ about 2.0) and narrow composition distribution (CDBI greater than about 70%) ethylene copolymers of this invention offer a melting range close to that desired. Because of the inherent compositional homogeneity of the product, there is predominantly only one melting peak of fairly tight melting range. The peak temperature position can be adjusted by manipulating the crystallinity (or density) of the product. FIG. 2 illustrates this capability for varying melting peak position. There is a minimum of amorphous, extractable species. These are undesirable in food contact applications.

FIG. 1C shows the desired melting behavior through blending with a lower melting, blend-compatible, component in order to lower seal initiation temperature to a point desirably lower than about 110° C. This figure shows the composite of the blended components. The peak melting point of low melting component should be high enough such that over the temperature range of its melting, a significant amount (i.e. greater than about 15%) of the propylene based polymer is also rendered molten. This fosters good intermolecular mixing of the low melting component with the polypropylene in the melt, leading to stronger seals. The peak melting point of the low melting component should also be low enough so as to allow meaningful reduction of the propylene based polymer's seal initiation temperature, and also, low enough so as to not introduce crystalline species that would deteriorate the optical properties of the random copolymer blend film (e.g., cause increase in film haze). The melting of the blend would be a superposition and merging of the melting behaviors shown for the individual components.

FIG. 1D shows the melting behavior of standard Zeigler-catalyzed VLDPEs as the low melting component (schematic for typical 0.908 D VLDPE). These products are generally broader in molecular weight distribution and composition distribution and are less desirable as the low melting blend component. They are almost always characterized by multiple melting peaks (2 or more), particularly peaks of higher melting temperature, reflective of the high ethylene containing (high crystallinity) species in the composition. The presence of these high melting peaks is not significantly influenced by lowering product density.

Data measurements over many samples, depicting this feature, are shown in FIG. 2 which shows the high crystallinity species that cause undesirable effects. Their high melting behavior (peak positions are around 120° to 125° C., which is not far removed from that of the random copolymer polypropylene) significantly compromised the chances for a meaningful reduction in the polypropylene's seal initiation temperature, and they contribute to an increase in film haze. While some reduction in the relative amount of these high melting species is possible by going to lower overall product densities, this approach increases the content of amorphous, extractable species, which is undesirable in food contact applications.

The percent hexane extractables for the low melting polymer ingredient of the present invention should be low enough to allow for applications in the food industry. Generally the percent extractables is in the range of about 2 percent to upwards of 10 percent. Preferably, for food packaging applications, products having extractables 5 percent and under would be utilized.

Hexane extractables is determined according to the U.S. FDA procedure 21 CFR 177.1520(d)(3)(ii), in which a sample is extracted at 50° C. in n-hexane (commercial grade) for 2 hours. The filtrate is evaporated and the total residue weighted as a measure of the solvent extractable fraction. A sample size of 2.5 gm 4 mils gauge (0.102 mm), is extracted in 1 liter of solvent.

VLDPEs and plastomers utilized as the low melting polymer of the present invention, comprise ethylene and an alpha-olefin other than ethylene (examples: $C_3$ to $C_8$ alpha-olefins). Generally, such a plastomer or VLDPE will comprise in the range of about 85 mole percent to about 96 mole percent ethylene.

The composition distribution breadth index (CDBI) of such VLDPEs and plastomers utilized will generally be in the range of about 70 percent or higher. The CDBI is defined as the weight percent of the copolymer molecules having a comonomer content within 50 percent (i.e. ±50%) of the median total molar comonomer content. The CDBI of linear polyethylene, which does not contain a comonomer, is defined to be 100%.

The Composition Distribution Breadth Index (CDBI) is determined via the technique of Temperature Rising Elution Fractionation (TREF). CDBI determination clearly distinguishes, for example, the VLDPE/plastomers of this invention (narrow composition distribution as assessed by CDBI values generally above 70%) from VLDPEs available commercially today (broad composition distribution as assessed by CDBI values generally less than 55%). The benefits to the subject invention that accrue through the specific use of VLDPEs/plastomers of narrow composition distribution are elucidated later in the examples. The CDBI of a copolymer is readily calculated from data obtained from techniques known in the art, such as, for example, temperature rising elution fractionation as described, for example, in U.S. patent application Ser. No. 131,350, U.S. application Ser. No. 151,350, filed Feb. 2, 1988, or in Wild et al., *J. Poly. Sci, Poly. Phys. Ed.*, vol. 20, p. 441 (1982). Unless otherwise indicated, terms such as "comonomer content", "average comonomer content" and the like refer to the bulk comonomer content of the indicated interpolymer blend, blend component or fraction on a molar basis.

Utilizing a metallocene catalyst, the VLDPEs and plastomers useful as the low melting polymers of the present invention can be produced in accordance with any suitable polymerization process, including a slurry polymerization, gas phase polymerization, and high pressure polymerization process.

A slurry polymerization process generally uses super-atmospheric pressures and temperatures in the range of 40°–100° C. In a slurry polymerization, a suspension of solid, particulate polymer is formed in a liquid polymerization medium to which ethylene and comonomers and often hydrogen along with catalyst are added. The liquid employed in the polymerization medium can be an alkane, cycloalkane, or an aromatic hydrocarbon such as toluene, ethylbenzene or xylene. The medium employed should be liquid under the conditions of polymerization and relatively inert. Preferably, hexane or toluene is employed.

In modification, the polymer components of the present invention may be formed by gas-phase polymerization. A gas-phase process utilizes super-atmospheric pressure and temperatures in the range of about 50°–120° C. Gas phase polymerization can be performed in a stirred or fluidized bed of catalyst and product particles in a pressure vessel adapted to permit the separation of product particles from unreacted gases. Thermostated ethylene, comonomer, hydrogen and an inert diluent gas such as nitrogen can be introduced or recirculated so as t maintain the particles at a temperature of 50° C.–120° C. Triethylaluminum may be added as needed as a scavenger of water, oxygen, and other adventitious impurities. Polymer product can be withdrawn continuously or semi-continuously at a rate such as to maintain a constant product inventory in the reactor. After polymerization and deactivation of the catalyst, the product polymer can be recovered by any suitable means. In commercial practice, the polymer product can be recovered directly from the gas phase reactor, freed of residual monomer with a nitrogen purge, and used without further deactivation or catalyst removal.

The polyethylene copolymers of the present invention can also be produced in accordance with a high pressure process by polymerizing ethylene in combination with other monomers such as butene-1, hexene-1, octene-1, or 4-methylpentene-1 in the presence of the catalyst system comprising a cyclopentadienyl-transition metal compound and an alumoxane compound. It is important, in the high-pressure process, that the polymerization temperature be above about 120° C. but below the decomposition temperature of said product and that the polymerization pressure be above about 500 bar (kg/cm$^2$). In those situations wherein the molecular weight of the polymer product that would be produced at a given set of operating conditions is higher than desired, any of the techniques known in the art for control of molecular weight, such as the use of hydrogen or reactor temperature, may be used in the process of this invention.

Polypropylene random copolymer is preferred over homopolypropylene since it has a lower melting temperature and lower seal initiation temperature. The concept of blending a low melting ingredient like VLDPE or plastomer would however also apply to homopolypropylene.

The propylene based polymers or copolymers of the present invention are generally any propylene based polymer or copolymer of propylene such as homopolypropylene, impact copolymers, polypropylene copolymers, and polypropylene random copolymers. Preferably the propylene base polymer or copolymer is homopolypropylene or polypropylene random copolymers. Most preferably, the propylene based polymer or copolymer is polypropylene random copolymer.

The polypropylene random copolymer useful in the heat sealable blend composition of the present invention is composed of propylene as a main component and an alpha-olefin other than propylene. The content of the propylene in the random copolymer is generally in the range of about 88 to about 99 mole percent, based on total moles, preferably in the range of about 90 mole percent to about 94 mol percent. The content of the alpha-olefin (e.g. ethylene) other than propylene is generally in the range of about 12 mol percent to about 1 mol percent, based on total moles, preferably in the range of about 10 mol percent to about 6 mol percent.

Filmable polypropylene random copolymers useful in the present invention are well known to those of skill in the heat sealing art for polypropylene. An example of a filmable random copolymer polypropylene is Exxon Chemical's Excorene ™ PD-9282. This product is 5 MFR, 5 wt % olefin comonomer. It has a DSC peak melting temperature of about 132° C.

Several commercial polymerization technologies are available to produce these polypropylene random copolymers. These are well known to those of skill in the art of polypropylene polymerization.

The blend composition will generally comprise in the range of about 30 to about 50 weight percent, low melting ingredient and in the range of about 70 to about 50 weight percent of a propylene based polymer both based on the total weight of the low melting ingredient and propylene based polymer. These are preferred ranges. Generally a beneficial contribution from the addition of the low melting ingredient will be noted at a level of about 10 wt %. At a level above 70 wt % low melting ingredient, the blend product shows deficiencies in properties such as rigidity, abrasion resistance and elevated temperature resistance, others.

In some applications, for example in food and flexible packaging, it is important that the amount of haze in the final heat sealable film be minimized so that the film can clearly display the packaged contents and be aesthetically pleasing. In selecting the low melting polymer ingredient and the propylene based polymer, it is believed that a deterioration of haze can be mitigated by blending low melting polymer ingredient and propylene based polymer having similar densities to minimize refractive index differences, and having similar rheologies (i.e. shear viscosities under processing conditions) to obtain optimum dispersed phase domain size/morphology.

The heat sealable blend composition of the present invention can be used to manufacture heat sealable film and articles using film fabrication technologies well known to those skilled in the art. For example, the blend may be cast extruded or coextruded into film using a flat die or blown extruded or coextruded into film using a tubular die. Such films may optionally be further oriented (either uniaxially or biaxially) using technologies well known to those skilled in the art. The heat sealable film and articles of the present invention may be incorporated onto film substrates or other articles to provide for heat sealing. For example a heat sealing film of the present invention may be included onto one or both surfaces of a prefabricated base layer of substrate film via lamination. The heat sealable film(s) or base substrate film may themselves be un-oriented, uniaxially oriented or biaxially oriented.

The base substrate layer or film will most commonly be polypropylene (homo or co-polymer). Other polyolefin type substrates however could also benefit from the heat sealable blend compositions of this invention.

The above are just a few examples of film constructions utilizing the heat sealable blend composition of this invention. Several others are possible, as will be apparent to those skilled in the art of film construction design and fabrication.

The film products made with the blend of the present invention are useful in a wide variety of bag and pouch applications in which heat sealability is important. Bag and pouch forming include, but are not limited to horizontal form-fill-and-seal, and vertical form-fill-and-seal.

Some key properties of the final film are heat sealability and seal strength, hot tack, tensile strength, film rigidity, haze and gloss, extractables, and abrasion resistance.

EXAMPLES

EXAMPLE I

Preparation of VLDPE-1 (1.7 MI, 0.897D, butene-1 Comonomer)

A catalyst is prepared by adding 5.1 liters of a 10% solution of trimethylaluminum in heptane into a dry and oxygen-free two-gallon reactor equipped with a mechanical stirrer. 800 g of undehydrated silica gel, containing 12.3% water, is slowly added into the reactor. After the addition is complete, the mixture is stirred at ambient temperature for one hour. 20 g of di-(n-butylcyclopentadienyl) zirconium dichloride slurried in 30 l of heptane is then added into the reactor and the mixture is allowed to react at ambient temperature for 30 minutes. The reactor is then heated to 65° C., while a nitrogen gas is purged through the reactor to remove the solvent. The nitrogen purging is stopped when the mixture in the reactor turns into a free-flowing powder.

The polymerization was conducted in a 16-inch diameter fluidized gas phase reactor. Ethylene, butene-1 and nitrogen were fed continuously into the reactor to maintain a constant production rate. Product was periodically removed from the reactor to maintain the desired bed weight. The polymerization conditions are shown in the Table below.

TABLE I

| Gas Phase Polymerization | |
|---|---|
| Temperature (°F.) | 144 |
| Total Pressure (psia) | 300 |
| Gas Velocity (ft/sec) | 1.59 |
| Catalyst Feed Rage (g/hr) | 4.8 |
| Production Rate (lb/hr) | 40 |

The polymerized product had a weight average molecular weight $M_w$) of 87,000 and a polydispersity ($M_w/M_n$) of 2.05. The density was measured as 0.897 g/cm$^3$.

EXAMPLE II

Narrow molecular weight distribution and narrow composition distribution VLDPEs/Plastomers as the low melting ingredient in the blend, versus currently available VLDPEs, show several advantages. The narrower CD provides a lower melting temperature, for lower seal initiation temperature and better tailoring of the melting point distribution of the blend product, to provide better low temperature sealing capability. Additionally, the lower extractables permit broader food contact possibilities, and better blocking resistance. The narrower MWD enhances the haze/clarity properties of a film. A comparison of these resin/film properties for neat VLDPE of the type required and used in this invention versus competitive, more broadly distributed VLDPEs is shown in Table II.

Figure 3:
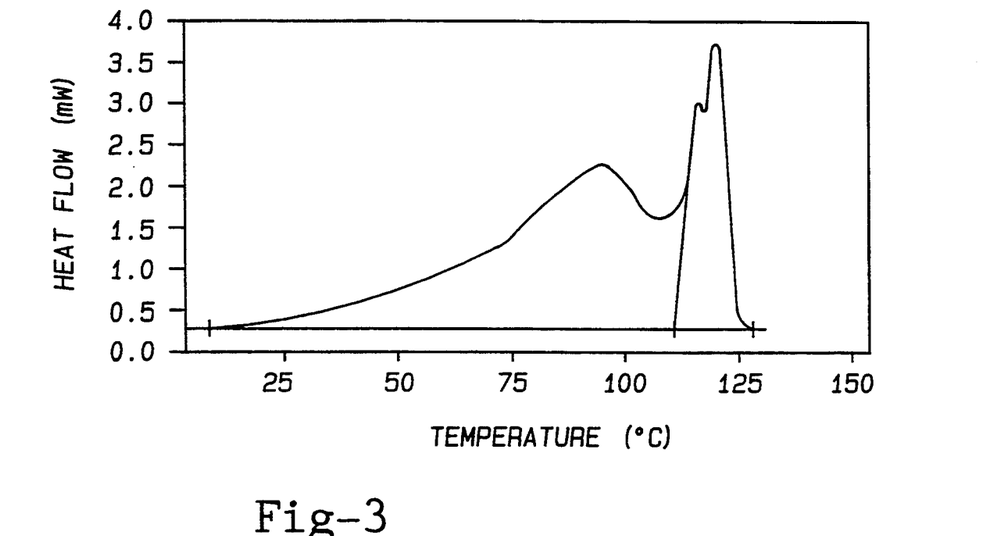
FIG. 3 is a DSC curve for a low melting ethylene based copolymer which does not have an essentially single melting point in the range of 60° to 125° C. and is not suitable as a blend component (a).

The competitive VLDPEs listed in Table II were selected on the basis of their density being the lowest density material which is commercially available. From Mitsubishi an ethylene-1-butene was available, whereas the lowest density material available from Dow was an ethylene-1-octene material. The DSC curve for the Dow material is shown in FIG. 3.

Figure 4:
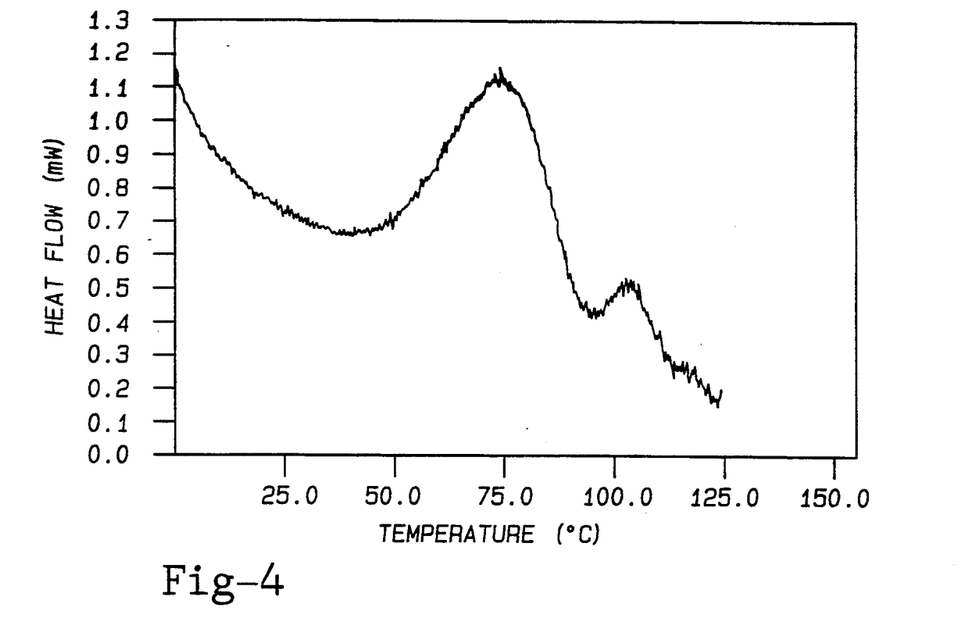
FIG. 4 is a DSC curve for a low melting ethylene based copolymer useful as blend component (a).

VLDPE-1 of this example was prepared according to Example I, and its DSC curve is shown in FIG. 4.

Figure 7:
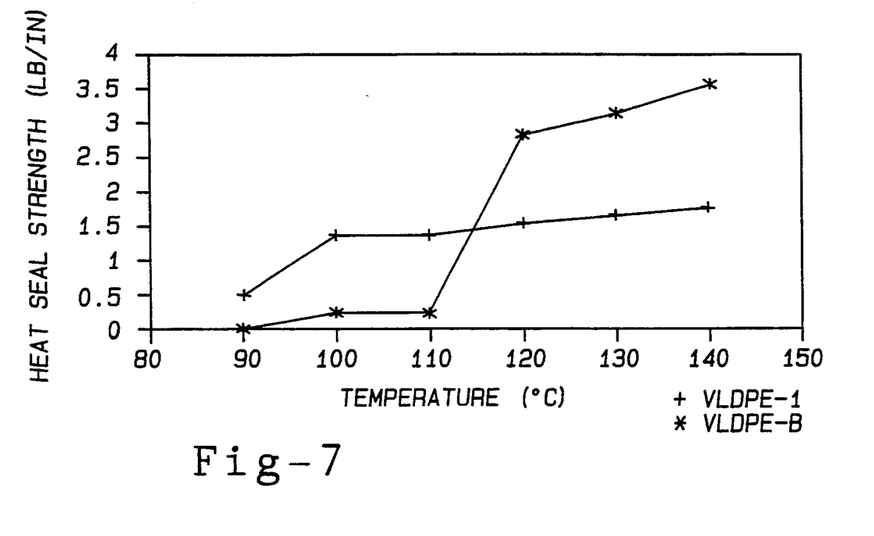
FIG. 7 is a graph of temperature vs. heat seal strength for two neat film samples; the -*---*- line is that of a film prepared from the polymer material of FIG. 3, the -+---+- line is that of a film prepared from the polymer material of FIG. 4.

Monolayer film heat seal data of competitive VLDPE B with VLDPE-1 of this invention is shown in FIG. 7. FIG. 7 illustrates the seal strength obtained wherein a seal is formed at various heat sealing temperatures in the range of 90° C. to 140° C., in 10° C. increments. The films were about 1.5 mil gauge produced on a cast film line. Sealing conditions: 14 psi pressure, 1.0 sec. dwell time; Theller Model EB Heat Sealer. VLDPE-1 provides adequate heat seals (seal strength greater than 1 lb/inch) at a lower temperature than competitive VLDPE B. The final seal strength developed by competitive VLDPE B at the higher temperatures is stronger than that for VLDPE-1; Comonomer type [octene-a vs butene-1] and MW [0.8 MI vs. 1.7 MI] are two reasons, as is well known in the art. Adjustments in these areas can be expected to increase the final seal strength of VLDPE 1 at the higher sealing temperatures.

EXAMPLE III

Melt blends of Exxon's Escorene ™ PD-9282 (5 MFR, 95 wt % propylene/5 wt % ethylene) with VLDPE-1 as described in Example I (1.7 MI, 0.897 D, butene-1 comonomer) were prepared on a compounding extruder (1 inch MPM extruder) as follows:
80% PD-9282/20% VLDPE-1
60% PD-9282/40% VLDPE-1
30% PD-9282/70% VLDPE-1

Figure 8:
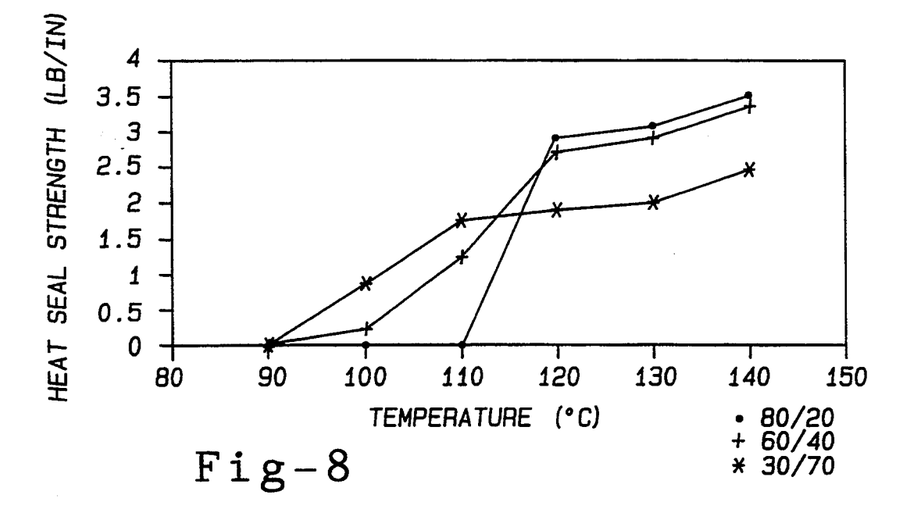
FIG. 8 is a graph of temperature vs. heat seal strength for polypropylene random copolymer/VLDPE blends of various compositions wherein the component (a) of the blend is the polymer of FIG. 4.
Figure 9:
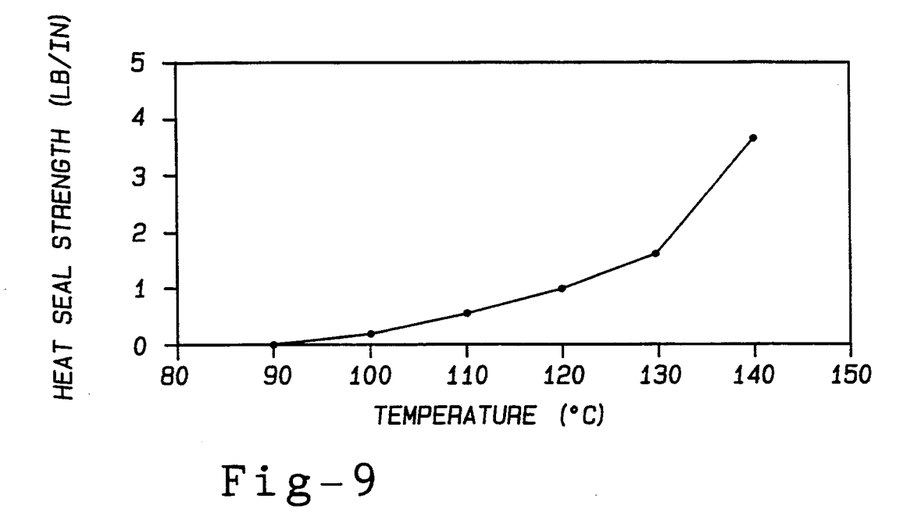
FIG. 9 is a graph of temperature vs. heat seal strength for neat film of the polypropylene random copolymer utilized as the blend component (b) for the films illustrated in FIG. 8.

Non-oriented, monolayer cast films of 1.5 mil gauge (Killion lab cast film line) were prepared from each of the 3 blend compositions above, using standard cast film processing conditions. Heat seal measurements performed using sealing conditions described in Example II. Heat seal data shown in FIG. 8. Heat seal data on neat PD-9282 (random copolymer polypropylene) film is shown in FIG. 9 for comparison.

The addition of VLDPE-1 to random copolymer polypropylene allows sealing to occur at lower temperatures than is possible with neat random copolymer polypropylene by itself. The blends provide a good balance of sealability at lower temperatures coupled with high seal strength.

TABLE II

RESIN/FILM PROPERTIES COMPARISON*
NEAT VLDPE USED IN THIS INVENTION V.
COMPETITIVE, MORE BROADLY DISTRIBUTED VLDPES

| SAMPLE COMONOMER | COMPETITIVE VLDPE A [Mitsubishi X-142] C$_4$ | COMPETITIVE VLDPE B [Dow ATTANE 4003] C$_8$ | VLDPE-1 VLDPE AS DESCRIBED IN THIS INVENTION C$_4$ |
|---|---|---|---|
| MI[dg/min] | 0.9 | 0.8 | 1.7 |
| Density [g/cm$^3$] | 0.900 | 0.906 | 0.897 |
| M$_w$/M$_n$ | 3.1 | 3.7 | 2.0 |
| DSC Peak T$_m$s [°C.] | 91,110 | 96,123 | 77,102 |
| Composition Distribution Breadth Index [CDBI %] [NOTE: A higher value of breadth index implies a narrow Composition Distribution] | 55 | 46 | 75 |
| Hexane Exatract [%] | 8 | 4.9 | 3.5 |
| Haze [%] (1.25 mil blown film) | 5 | 10.5 | 3.4 |

CAPSULE: THE NARROWER MOLECULAR WEIGHT DISTRIBUTION AND COMPOSITION DISTRIBUTION OF THE VLDPES AND PLASTOMERS OF THIS INVENTION VS THE COMPETITIVE VLDPEs ALLOWS; LOWER DSC PEAK MELTING TEMPERATURE(S) LOWER FILM HAZE LOWER HEXANE EXTRACTABLES

EXAMPLE IV

Preparation of VLDPE-2 (2.1 MI 0.906, Butene-1Comonomer)

The catalyst for polymerizing this ethylene copolymer was prepared as follows. An 800 gram quantity of silica gel and a 2700 ml aliquot of methylalumoxane/toluene solution (10%) were placed in a two-gallon reactor and allowed to react at ambient temperature for one hour. A 21.6 gram quantity of di-(n-butylcyclopentadienyl) zirconium dichloride slurried in 300 ml of toluene was added into the reactor and the mixture was allowed to react at 65° C. for 30 minutes. The reactor was then heated at 75° C. while nitrogen gas was purged through the reactor to remove the solvent. The heating and nitrogen purging were stopped with the mixture in the reactor turned into a free-flowing powder.

The polymerization was conducted in a 16-inch diameter fluidized bed gas-phase reactor. Ethylene, butene-1, and nitrogen were fed continuously into the reactor to maintain a constant production rate. Product was periodically removed from the reactor to maintain the desired bed weight. The polymerization conditions are shown in the Table below.

TABLE III

| Gas phase Polymerization | |
| --- | --- |
| Temperature (°F.) | 139 |
| Total Pressure (psia) | 300 |
| Gas Velocity (ft/sec) | 1.67 |
| Catalyst Feed Rate (g/hr) | 15 |
| Production Rate (lb/hr) | 20 |

The polymerized product had a measured Melt Index of 2.1 and a density of 0.906 g/cm$^3$.

Figure 5:
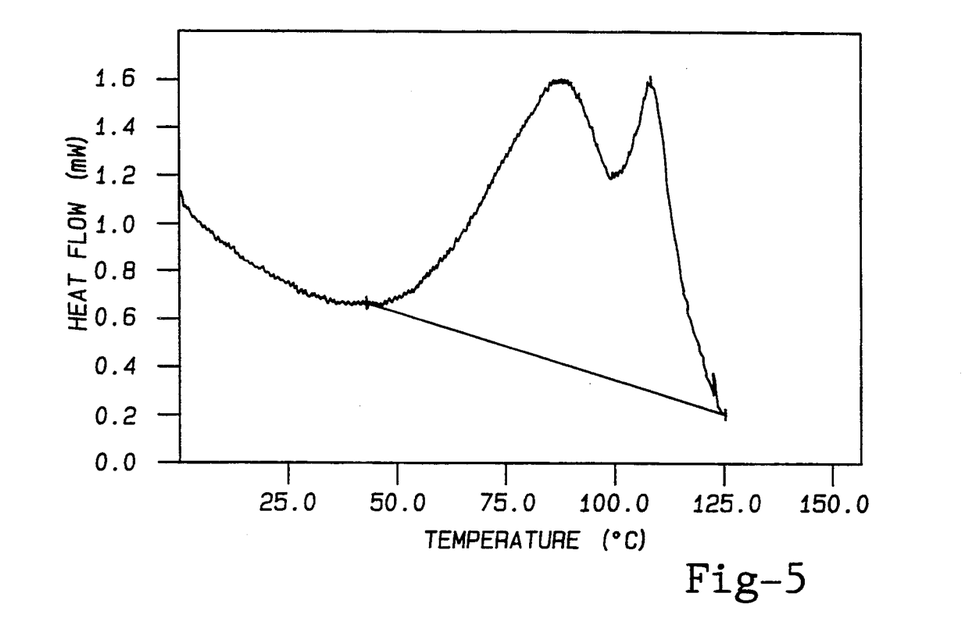
FIG. 5 is a DSC curve for a low melting ethylene based copolymer useful as blend component (a).

The DSC curve for this material is shown in FIG. 5.

EXAMPLE V

Melt blends of Exxon's Escorene ™ PD-9282 (5 MFR, 5 wt % comonomer) with VLDPE-2 prepared according to Example IV (2.1 mi, 0.906D, butene-1 comonomer) were prepared on a compounding extruder (1 inch extruder MPM) as follows:

80% PD-9282/20% VLDPE 2
60% PD-9282/40% VLDPE 2
30% PD-9282/70% VLDPE 2

Figure 10:
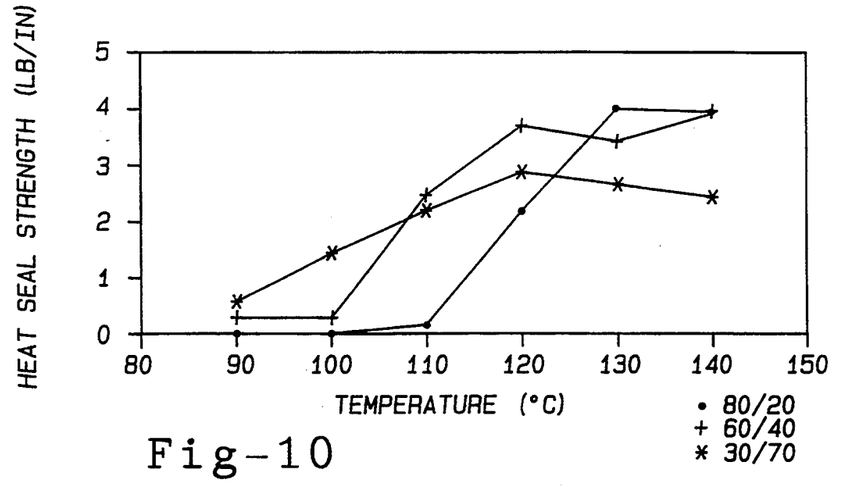
FIG. 10 is a graph of temperature vs. heat seal strength for polypropylene random copolymer/VLDPE blends of various compositions wherein component (a) is the polymer of FIG. 5.

Monolayer, non-oriented cast films were prepared from each of the blends and evaluated for heat seal performance, per conditions described previously in Examples II and III. The heat seal data is shown in FIG. 10.

As observed in Example III, these blend films also provide a favorable balance of sealability at lower temperatures coupled with high seal strength.

EXAMPLE VI

Preparation of Plastomer-1 (3.7 MI 0.8816D, Butene-1 Comonomer)

A catalyst is prepared by adding 5.1 liters of a 10% solution of trimethylaluminum in heptane into a dry and oxygen-free two-gallon reactor equipped with a mechanical stirrer. 800 g of undehydrated silica gel, containing 12.3% water, is slowly added into the reactor. After the addition is complete, the mixture is stirred at ambient temperature for one hour. 20 g of di-(n-butylcyclopentadienyl) zirconium dichloride slurried in 30 ml of heptane is then added into the reactor and the mixture is allowed to react at ambient temperature for 30 minutes. The reactor is then heated to 65° C., while a nitrogen gas is purged through the reactor to remove the solvent. The nitrogen purging is stopped when the mixture in the reactor turns into a free-flowing powder.

The polymerization was conducted in a 16-inch diameter fluidized gas phase reactor. Ethylene, butene-1 and nitrogen were fed continuously into the reactor to maintain a constant production rate. Product was periodically removed from the reactor to maintain the desired bed weight. The polymerization conditions are shown in the table below.

Table IV

TABLE IV

| Gas Phase Polymerization | |
| --- | --- |
| Temperature (°F.) | 123 |
| Total Pressure (psia) | 300 |
| Gas Velocity (ft/sec) | 1.32 |
| Catalyst Feed Rate (g/hr) | 10 |
| Production Rate (lb/hr) | 49 |

The polymerized product had a weight average molecular weight ($M_w$) of 81,000 and a polydispersity ($M_w/M_n$) of 2.4. The density was measured as 0.8816 g/cm$^3$.

Figure 6:
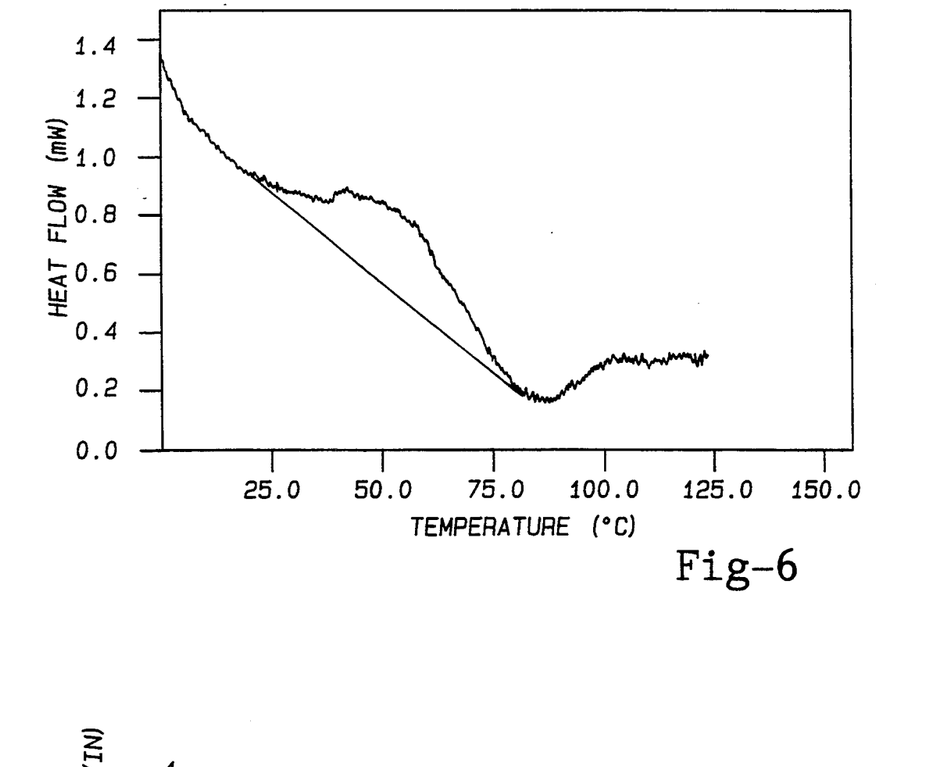
FIG. 6 is a DSC curve for a low melting ethylene based copolymer useful as blend component (a).

The DSC curve for this material is shown in FIG. 6.

EXAMPLE VII

Melt blends of Exxon's Escorene ™ PD-9282 with Plastomer-1 prepared according to Example VI (3.7 MI, 0.8816, butene-1 comonomer) were prepared as follows:

80%/PD-9282/20% Plastomer-1
60% PD-9282/20% Plastomer-1
30% PD-9282/70% Plastomer-1

Figure 11:
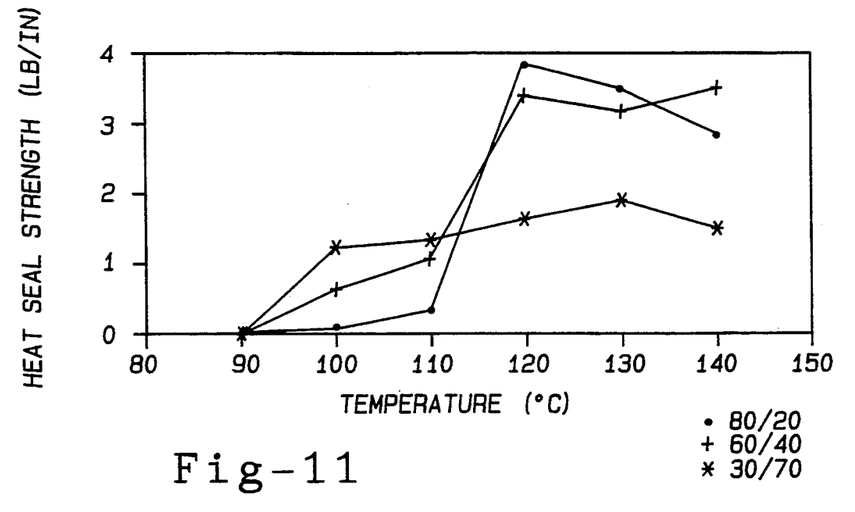
FIG. 11 is a graph of temperature vs. heat seal strength for polypropylene random copolymer/plastomer blends of various compositions where component (a) of the blend is the polymer of FIG. 6.
Figure 12A:
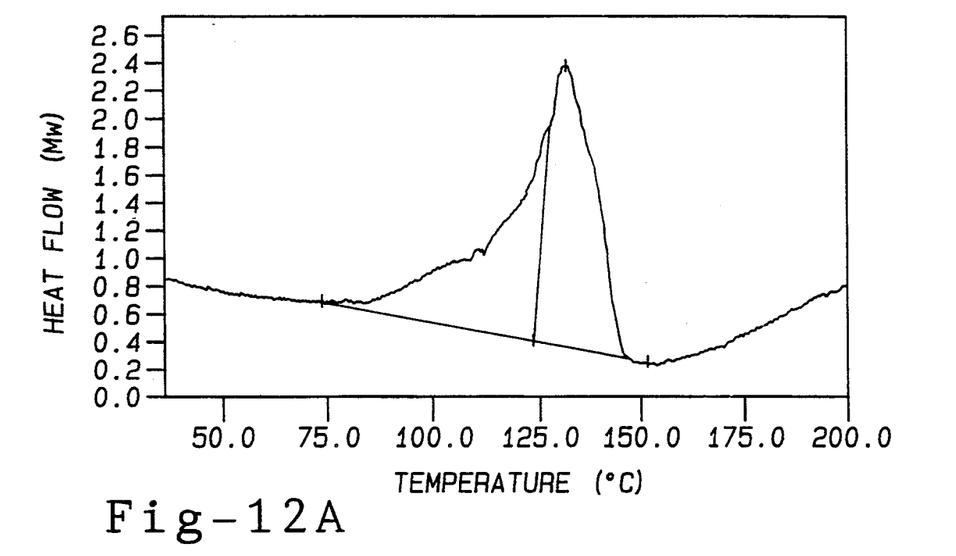
FIG. 12 is a compilation of DSC melting curves of neat polypropylene random copolymer, and blends of the copolymer with varying amounts of a low melting ethylene based copolymer useful as blend component (a); the component (a) being the polymer of FIG. 4. de
Figure 12B:
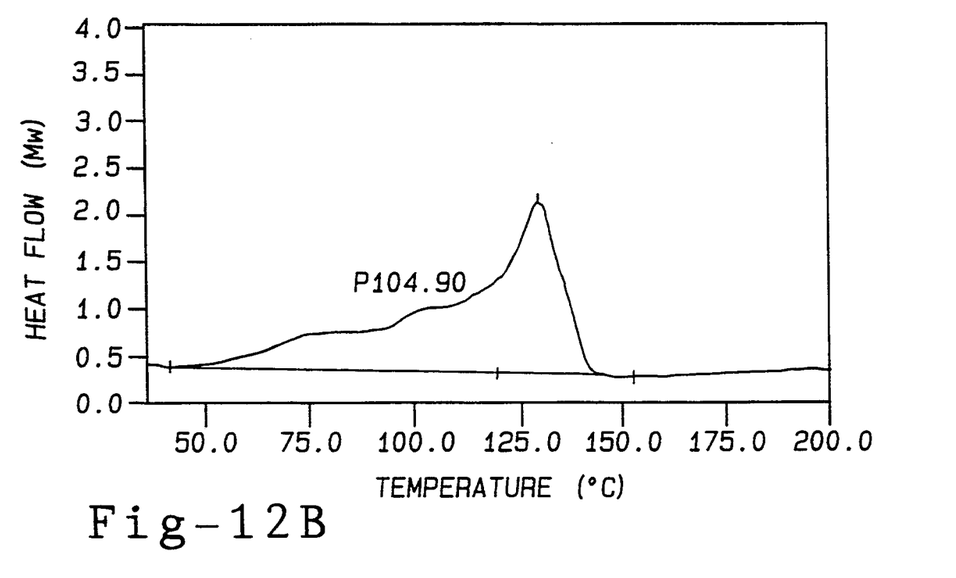
Figure 12C:
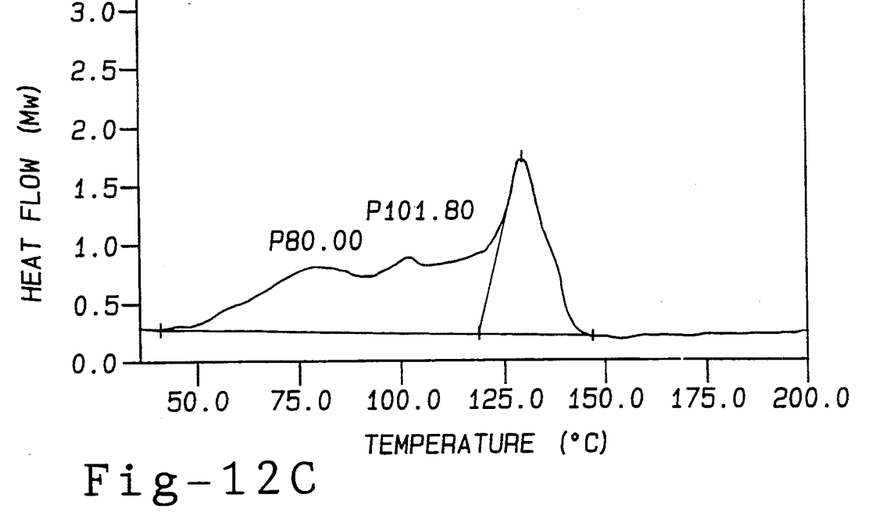
Figure 12D:
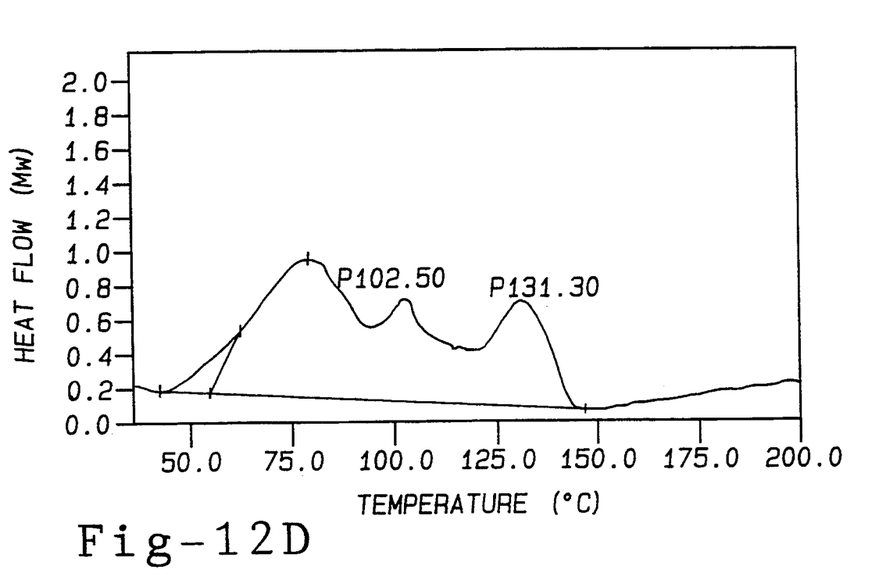

As in the previous Examples, heat seal data was generated (FIG. 11).

Again, the blends show a favorable balance of sealability at lower temperatures coupled with high seal strength.

EXAMPLE VIII

Film Optical properties, hexane extractables and DSC melting data were measured on the blends described in Examples III, V and VII. Similar data were generated for neat random copolymer polypropylene PD-9282 film, for comparison purposes. This sample is a representation of the product used in the industry today as a heat seal layer for polypropylene films. The data are shown in Table V. DSC melting curves on the blends and neat PD-9282 random copolymer polypropylene (RCP) are shown in FIG. 12.

The data shows:

RCP/VLDPE blends show good extractables levels, lower than neat RCP. Blends with the Plastomer-1 however show higher extractables.

DSC melting curves show the capability to extend the melting range of RCP to lower temperatures, via the addition of VLDPE or Plastomer. Particularly for blends of RCP with VLDPE [density in the range of about 0.90–0.91 g/cm$^3$], good merging of the individual melting ranges was noted, which is believed to be desirable [see FIG. 12].

Haze/Gloss numbers on the blend films are, to a first approximation, in line with the neat RCP film values.

In review, the data show that a narrow molecular weight distribution and narrow composition distribution VLDPE (density of about 0.90–0.91 g/cm$^3$) provides an improved balance of properties in blends with random copolymer polypropylene: strong, lower temperature seals; low extractables; low film haze.

TABLE V

NON-ORIENTED CAST FILM PROPERTIES
[BLENDS OF RCP WITH VLDPES-1 AND -2 AND PLASTOMER-2

| | HEXANE EXTRACTABLES | DSC PEAK Tm (°C.) | HAZE (%) | GLOSS (%) |
|---|---|---|---|---|
| RCP/VLDPE 1 BLENDS | | | | |
| 80% PD9282/20% | 3.97/3.94 | 105, 131 | 11 | 50 |
| 60% PD9281/40% | 3.79/3.91 | 80, 102, 131 | 19+ | 36+ |
| 30% PD9282/70% | 3.27/3.32 | 78, 103, 131 | 15 | 43 |
| RCP/PLASTOMER-1 BLENDS | | | | |
| 80% PD9282/20% | 3.88/3.90 | 103, 132 | 16 | 16 |
| 60% PD9282/40% | 9.50/9.23 | 103, 132 | | |
| 30% PD9282/70% | 35.9/37.0 | 63, 101, 131 | | |
| RCP/VLDPE-2 BLENDS | | | | |
| 80% PD9282/20% | 3.56/3.59 | 106, 132 | 11 | 47 |
| 60% PD9282/40% | 2.79/2.85 | 90, 107, 131 | 10 | 49 |
| 30% PD9282/70% | 1.85/1.88 | 89, 107, 132 | 4 | 73 |
| PD9282 5 MFR, 5% C | 5.02/5.01 | 132 | 13 | 48 |
| 40% PD9282/60% XR107L | 8.06/8.34 | 99, 132 | | |
| EX300 VLDPE 1.7 MI, 0.897 Density | 3.43 | 77, 102 | | |
| Dowlex VLDPE 0.8 MI, 0.906 Density | 4.9 | 96, 123 | | |

+Film thickness on this sample was mil vs 1.6 mil for others during haze/gloss testing.

VLDPE-1 is Polymer with 1.7 MI, 0.897 Density
Plastomer-1 is Polymer with 3.7 MI, 0.8816 Density
VLDPE-2 is Polymer with 2.1 MI, 0.906 Density.

EXAMPLE IX

Coextruded oriented polypropylene (OPP) films were produced using blends of VLDPE and random copolymer polypropylene as skin layers. The films were produced on a pilot OPP film line, producing biaxially oriented films. The films were 3 layer coex films, with skin layers on either side of a homopolypropylene core (1μ/20μ/1μ thicknesses). The core layers were Exxon's Excorene™ PP-4252 (3 MFR propylene homopolymer). The preparation of coextruded, biaxially oriented films is readily done using techniques will know in the art. Polymer is extruded through a slot die in sheet form, which is then oriented sequentially along the machine and transverse directions at elevated temperatures. Typical values set for some key processing parameters were:

| | |
|---|---|
| Melt temperature | 265° C. |
| MD Stretching Temperature | 100° C. |
| MD Stretching Ratio | 5.5 |
| TD Stretching Temperature | 160° C. |
| TD Stretching Ratio | 8.0 |

Property data on two films is shown in Table VI, which had constructions as follows:

Film 1
Core layer: PP-4252 (3 MFR homopolymer)
Skin layer: blend of 80% PD-9282 (random copolymer polypropylene; 5 MFR, 5 wt % ethylene comonomer) with 20% VLDPE 1 (1.7 MI, 0.897D, butene-1 comonomer)

Film 2
Core layer: PP-4252 (3 MFR homopolymer)
Skin layers: blend of 80% PD-9282 (random copolymer polypropylene; 5 MFR, 5 wt % ethylene comonomer) with 20% competitive VLDPE-B ( 0.8 MI, 0.906D, octene-1 comonomer)

The heat seal skin layers of Film 1 contain the narrower molecular weight distribution, narrower composition distribution VLDPE of this invention. The skin layers of Film 2 contain a competitive, more broadly distributed VLDPE. The film data in Table VI show Film 1 to exhibit sealability at lower seal temperatures than Film 2. Also, Film 1 displays better film clarity (lower haze, higher gloss) than Film 2.

This data on RCP/VLDPE blends complements the findings presented in Example II on neat films of VLDPE 1 and competitive VLDPE-B, further illustrating the benefits of narrower MWD, narrower CD VLDPE of this invention in polypropylene heat seal films, versus the more broadly distributed VLDPEs that are common in the industry today.

TABLE VI

VLDPE/RANDOM COPOLYMER POLYPROPYLENE BLEND OPP FILMS

| FILM | SKIN LAYER (COMPOSITION %) | | SEAL STRENGTH, g/in | | | | TOTAL HAZE | GLOSS |
|---|---|---|---|---|---|---|---|---|
| | RCP | VLDPE | 110° C. | 120° C. | 130° C. | 140° C. | | |
| FILM 1 (Invention) | 80 | 20* | 100 | 341 | 363 | 381 | 4 | 72 |
| FILM 2 | 80 | 20** | 10 | 236 | 286 | 318 | 19 | 40 |

TABLE VI-continued
VLDPE/RANDOM COPOLYMER POLYPROPYLENE BLEND OPP FILMS

| FILM | SKIN LAYER (COMPOSITION %) | | SEAL STRENGTH, g/in | | | | TOTAL HAZE | GLOSS |
| --- | --- | --- | --- | --- | --- | --- | --- | --- |
| | RCP | VLDPE | 110° C. | 120° C. | 130° C. | 140° C. | | |
| (Comparative) | | | | | | | | |

*VLDPE-1 [1.7 MI, 0.897D, butene-1 comonomer; narrow MWD and CD]
**VLDPE-B [0.8 MI, 0.906D, octene-1 comonomer; broader MWD and CD]

We claim:

1. A polymer blend composition when formed into a film has a seal initiation temperature below about 100° C. said polymer blend composition comprising:
   (a) from about 30 to about 70 weight percent of a polymer comprising an ethylene-alpha-olefin copolymer having a density of from about 0.88 g/cm$^3$ to about 0.915 g/cm$^3$, a melt index of from about 1.5 dg/min to about 7.5 dg/min, a molecular weight distribution less than about 3.0, essentially a single peak melting point of between about 60° C. to about 100° C., and a composition breadth index greater than about 70 percent; and,
   (b) from about 70 to about 30 weight percent of a propylene based polymer having from about 88 mole percent to about 100 mole percent propylene and from about 12 mole percent to about 0 mole percent of an alpha-olefin other than propylene.

2. The composition of claim 1 wherein the low melting polymer is from about 40 to about 60 weight percent.

3. The composition of claim 1 wherein the low melting polymer is about 50 weight percent.

4. The composition of claim 1 wherein (b) is a polypropylene random copolymer.

5. The composition of claim 1 wherein (a) is prepared using a metallocene catalyst system.

6. A film or sheet having a seal initiation temperature below about 100° C. said film or sheet comprising:
   (a) from about 30 to about 70 weight percent of a low melting polymer comprising an ethylene-alpha-olefin copolymer having a density of from about 0.88 g/cm$^3$ to about g/cm$^3$, a melt index of from about 1.5 dg/min to about 7.5 dg/min, a molecular weight distribution less than about 3.0, essentially a single peak melting point of between about 60° C. to about 100° C., and a composition breadth index greater than about 70 percent; and,
   (b) from about 70 to about 30 weight percent of a propylene based polymer having from about 88 mole percent to about 100 mole percent propylene and from about 12 mole percent to about 0 mole percent of an alpha-olefin other than propylene.

7. The film or sheet of claim 6 wherein (b) is a polypropylene random copolymer.

8. The film or sheet of claim 6 wherein (a) is prepared using a metallocene catalyst system.

9. The film or sheet of claim 6 wherein (a) has a density of from about 0.88 g/cm$^3$ to about 0.915 g/cm$^3$, a melt index of from about 1.5 dg/min to about 7.5 dg/min, a molecular weight distribution no greater than about 2.5.

10. A multiple layer heat sealable film having a seal initiation temperature below about 100° C. comprising at least one base layer and at least one heat sealable layer, the heat sealable layer comprising:
    (a) from about 30 to about 70 weight percent of a low melting polymer comprising an ethylene-alpha-olefin copolymer having a density of from about 0.88 g/cm$^3$ to about 0.915 g/cm$^3$, a melt index of from about 1.5 dg/min to about 7.5 dg/min, a molecular weight distribution less than about 3.0, essentially a single peak melting point of between about 60° C. to about 100° C., and a composition breadth index greater than about 70 percent; and,
    (b) from about 70 to about 30 weight percent of a propylene based polymer having from about 88 mole percent to about 100 mole percent propylene and from about 12 mole percent to about 0 mole percent of an alpha-olefin other than propylene.

11. The heat sealable film of claim 10 wherein the base layer is selected from the group consisting of polyolefins, polyesters, and polyamides.

12. The heat sealable film of claim 10 wherein the base layer is a polyolefin.

13. The heat sealable film of claim 13 wherein the base layer is a polypropylene.

14. The heat sealable film of claim 10 wherein (b) is a polypropylene random copolymer.

15. The heat sealable film of claim 10 wherein (a) is prepared using a metallocene catalyst system.

16. The heat sealable film of claim 10 wherein (a) has a density of from about 0.88 g/cm$^3$ to about 0.915 g/cm$^3$, a melt index of from about 1.5 dg/min to about 7.5 dg/min, a molecular weight distribution no greater than about 2.5.

* * * * *